United States Patent
Van Bommel et al.

(10) Patent No.: US 11,873,953 B2
(45) Date of Patent: Jan. 16, 2024

(54) LIGHT EMITTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Johannes Petrus Maria Ansems, Hulsel (NL); Peter Johannes Martinus Bukkems, Deurne (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/018,124

(22) PCT Filed: Jul. 26, 2021

(86) PCT No.: PCT/EP2021/070802
§ 371 (c)(1),
(2) Date: Jan. 26, 2023

(87) PCT Pub. No.: WO2022/023241
PCT Pub. Date: Feb. 3, 2022

(65) Prior Publication Data
US 2023/0280002 A1    Sep. 7, 2023

(30) Foreign Application Priority Data

Jul. 27, 2020 (EP) .................................... 20187923
Jul. 28, 2020 (EP) .................................... 20188144

(51) Int. Cl.
*F21K 9/61* (2016.01)
*F21K 9/232* (2016.01)
(Continued)

(52) U.S. Cl.
CPC ................ *F21K 9/61* (2016.08); *F21K 9/232* (2016.08); *G02B 6/0045* (2013.01); *F21V 2200/20* (2015.01); *F21Y 2115/10* (2016.08)

(58) Field of Classification Search
CPC ........ F21K 9/31; F21K 9/232; F21V 2200/20; G02B 6/0045
See application file for complete search history.

(56) References Cited

U.S. PATENT DOCUMENTS 7,455,444 B2    11/2008  Chien
8,415,865 B2 *   4/2013  Liang .................. F21V 19/0055
                                                         313/493

(Continued)

FOREIGN PATENT DOCUMENTS

DE    102011051045 A1    12/2012
DE    202013001417 U1     5/2014
(Continued)

*Primary Examiner* — Matthew J. Peerce (57) ABSTRACT

A light emitting device (1) comprising at least one LED light source (6, 61, 62) adapted for, in operation, emitting light source light, and an elongated light guide (2) comprising a height direction (H), a width direction (W), a depth direction (D), a longitudinal axis (L) extending in the height direction (H), a first major surface (31) and a second major surface (32) arranged extending opposite to the first major surface in the depth direction (D), a first minor surface (41) and a second minor surface (42) arranged extending opposite to the first minor surface in the width direction (W), and a first end (51) and a second end (52) arranged extending opposite to the first end in the height direction (H), where the elongated light guide (2) further comprises at least one light in-coupling element (7, 71, 72) configured to couple the light source light into the elongated light guide and at least one light out-coupling element (81, 82) configured to couple the light source light out of the elongated light guide, where the elongated light guide (2) is twisted around the longitu- (Continued)

dinal axis (L), and where the at least one light out-coupling element (81, 82) is elongated.

14 Claims, 5 Drawing Sheets (51) Int. Cl.
  *F21V 8/00* (2006.01)
  *F21Y 115/10* (2016.01)

(56) References Cited

U.S. PATENT DOCUMENTS

| | | | |
|---|---|---|---|
| 8,905,598 B2 | 12/2014 | Yokota et al. | |
| 9,897,736 B2 * | 2/2018 | Thorailler | B60Q 3/64 |
| 2013/0322076 A1 * | 12/2013 | Parker | F21K 9/232 |
| | | | 362/240 |
| 2014/0340927 A1 | 11/2014 | Johnston et al. | |
| 2016/0178827 A1 | 6/2016 | Thorailler | |
| 2017/0051877 A1 * | 2/2017 | Weijers | F21K 9/232 |

FOREIGN PATENT DOCUMENTS

| | | |
|---|---|---|
| JP | 03168673 U | 7/1991 |
| WO | 2013017403 A1 | 2/2013 |
| WO | 2018202625 A1 | 11/2018 |

\* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2021/070802, filed on Jul. 26, 2021, which claims the benefit of European Patent Application No. 20187923.6, filed on Jul. 27, 2020 and European Patent Application No. 20188144.8, filed on Jul. 28, 2020. These applications are hereby incorporated by reference herein.

FIELD OF THE INVENTION

The invention relates to a light emitting device comprising at least one LED light source adapted for, in operation, emitting light source light, an elongated light guide, at least one light in-coupling element configured to couple the light source light into the elongated light guide and at least one light out-coupling element configured to couple the light source light out of the elongated light guide.

BACKGROUND OF THE INVENTION

Incandescent lamps are rapidly being replaced by LED based lighting solutions. It is nevertheless appreciated and desired by users to have retrofit lamps which have the look of an incandescent bulb. For this purpose, one can simply make use of the infrastructure for producing incandescent lamps based on glass and replace the filament with LEDs emitting white light. One of the known concepts is based on LED filaments placed in such a bulb. The appearances of these lamps are highly appreciated as they look highly decorative. This type of LED filament lamp is selling in high volumes on the market.

For instance, JP 03168673 U1 discloses an incandescent lamp comprising a twisted light guide consisting of several pillars. The pillars of the light guide are twisted such as to have the shape of a helical spring. Furthermore, the pillars of the light guide are each rod-shaped with a circular transversal cross-section.

However, current LED filament lamps are rather expensive, for instance in terms of the costs of LED filaments and/or assembly costs. Also, current LED filament lamps have an undesired, typically yellow or yellowish, appearance, and they do not allow for color or color temperature tunability.

There is thus still a desire for providing a light emitting device allowing for producing an incandescent lamp, and in particular a LED filament luminaire, which light emitting device is cheaper to manufacture, which emits light with a clearer white appearance, and which allows for color or color temperature tunability of the emitted light.

In US 2014/340927 a lightguide is disclosed that functions as a luminaire. The luminaire includes at least one solid state light source, such as an LED, and a lightguide configured to receive light from the solid state light source. Light from the light source is coupled into the lightguide and transported within it by total internal reflection until the light exits the lightguide. A shape of the lightguide causes and directs extraction of the light, and can also be used to create a particular pattern of the extracted light. Such shapes include linear wedges and twisted wedges. Optical films can be included on the light input and output surfaces of the lightguide.

SUMMARY OF THE INVENTION

It is an object of the present invention to overcome or reduce at least some of these problems, and to provide a light emitting device which is cheaper to manufacture, which emits light with a clearer white appearance, and which allows for color or color temperature tunability of the emitted light.

According to a first aspect of the invention, this and other objects are achieved by means of a light emitting device comprising at least one LED light source adapted for, in operation, emitting light source light, and an elongated light guide comprising a height direction, a width direction, a depth direction and a central longitudinal axis extending in the height direction, where the elongated light guide further comprises
 a first major surface and a second major surface arranged extending opposite to the first major surface in the depth direction of the elongated light guide,
 a first minor surface and a second minor surface arranged extending opposite to the first minor surface in the width direction of the elongated light guide, and
 a first end and a second end arranged extending opposite to the first end in the height direction of the elongated light guide,
 where the elongated light guide further comprises at least one light in-coupling element configured to couple the light source light into the elongated light guide and at least one light out-coupling element configured to couple the light source light out of the elongated light guide, where the elongated light guide is configured to guide at least a portion of the light source light which is coupled into the light guide at the light in-coupling element via total internal reflection to the light out-coupling element, where the elongated light guide is twisted around the central longitudinal axis of the light guide, and where the at least one light out-coupling element is elongated.

Thereby, and especially by providing a light guide with the above described structure, a light emitting device is provided which has a particularly simple structure, and which is simpler to assemble. Thus, a light emitting device is provided which is cheaper to manufacture.

Furthermore, by providing that the elongated light guide is twisted around the central longitudinal axis of the light guide, and that the light out-coupling element is elongated, a light emitting device is provided which emits light with a clearer white appearance, and which allows for color or color temperature tunability of the emitted light.

In an embodiment, the elongated light guide is configured to guide more than 50%, more than 60%, or more than 70% of the light source light which is coupled into the light guide at the light in-coupling element via total internal reflection to the light out-coupling element.

In an embodiment, the elongated light guide further comprises a third major surface and a fourth major surface arranged extending opposite to the third major surface, the third major surface and the fourth major surface extending in an angle, β, with respect to the first major surface and the second major surface, a third minor surface and a fourth minor surface arranged extending opposite to the third minor surface, the third minor surface and the fourth minor surface extending in an angle, β, with respect to the first minor surface and the second minor surface, and a third end and a fourth end arranged extending opposite to the third end, the third end and the fourth end extending in an angle, β, with respect to the first end and the second end.

Thereby, and especially by providing a light guide with the above described structure, a light emitting device is provided which has a particularly simple structure, and which is simpler to assemble, while allowing for a clearer and brighter light output. Thus, a light emitting device is provided which is cheaper to manufacture and which provides a brighter white light output.

In an embodiment, the angle, β, is 90 degrees.

When twisting the elongated light guide around the central longitudinal axis of the light guide, this choice of angle, β, provides for a particularly well-functioning and desirable twisted shape.

In an embodiment, the elongated light guide is twisted around the central longitudinal axis of the light guide such as to have the shape of a screw, an Archimedes screw, a double screw or a double Archimedes screw.

Thereby, a light emitting device is provided which emits light with a particularly clear white appearance in a regular spiraling pattern, and which allows for color or color temperature tunability of the emitted light. Furthermore, the shape of a double screw or a double Archimedes screw provides for a light emitting device which emits light in a regular double spiraling pattern giving an especially pleasing appearance.

In an embodiment, the at least one light out-coupling element is arranged on or adjacent to at least a part of any one or more of the first minor surface, the second minor surface, the third minor surface and the fourth minor surface.

Thereby, a light emitting device is provided which emits light in a particularly regular spiraling pattern, or in a particularly regular double spiraling pattern.

In an embodiment, the at least one light out-coupling element comprises any one or more of light scattering features, light refracting features, light diffracting features and light converting features.

Such features provide for a particularly efficient out-coupling of light with very low losses.

In an embodiment, the at least one light in-coupling element is arranged at the first end, at the first minor surface or in the elongated light guide.

Thereby, a particularly efficient in-coupling of light into the light guide with very low losses is provided for.

In an embodiment, the at least one light in-coupling element comprises a LED filament. In an embodiment, the LED filament extends in the height direction, H, of the light guide throughout a part or all of the light guide.

Thereby, a light emitting device with a larger degree of versatility in terms of positioning of the light in-coupling element(s) is provided for.

In an embodiment, one or more of the first minor surface, the second minor surface, the third minor surface and the fourth minor surface is adapted for collimating incident light.

Thereby, a light emitting device is provided which emits light in a spiraling pattern, or in double spiraling pattern, which is further improved in terms of regularity and appealing appearance.

In an embodiment, the at least one light incoupling means comprises anisotropic light distributing features.

Thereby, a light emitting device is provided which emits light in a spiraling pattern, or in double spiraling pattern, which is further improved in terms of regularity and appealing appearance.

In an embodiment, the at least one light out-coupling element comprises multiple surfaces.

Thereby, a light emitting device is provided which emits light in a spiraling pattern, or in double spiraling pattern, which is further improved in terms of regularity and appealing appearance.

In an embodiment, at least one of the first major surface, second major surface, third major surface and fourth major surface comprises at least one light shaping feature.

Thereby, a light emitting device is provided which emits light in a spiraling pattern, or in double spiraling pattern, which is further improved.

In an embodiment, the at least one light source comprises any one or more of a warm white LED, a cool white LED and RGB LED(s).

Thereby, a light emitting device is provided which allows for particularly efficient color or color temperature tunability of the emitted light, and where the emitted light comprises a clear white and agreeable appearance.

In an embodiment, the average intensity at the minor surfaces is I1, the average intensity at the major surfaces is I2, and I1>2*I2. Particularly, the average intensity at the minor surfaces at which a light out-coupling element is arranged is I1.

Thereby, a light emitting device is provided which emits light in a spiraling pattern, or in double spiraling pattern, which is further improved in terms of intensity and appealing appearance.

In an embodiment, at least one of the first major surface and the second major surface, the first minor surface and the second minor surface, the first end and the second end, the third major surface and the fourth major surface, the third minor surface and the fourth minor surface, and the third end and the fourth end are mutually parallel. Thereby, a light emitting device is provided which emits light with a particularly clear white appearance in a particularly regular spiraling pattern, and which allows for color or color temperature tunability of the emitted light in a particularly efficient manner.

In an embodiment, the LED light sources comprise a first light source emitting first light source light and a second light source emitting second light source light being different from the first light source light.

In an embodiment, the LED light sources comprise RGB LEDs, CW and WW LEDs, or RGBW LEDs.

In an embodiment, the light emitting device further comprises a controller for individually controlling the first light source and the second light source to tune the color and/or color temperature.

Such embodiments provide for a light emitting device which allows for a particularly efficient and well-functioning color or color temperature tunability of the emitted light.

The light emitting device may further comprise a base for connecting the light emitting device to a luminaire base and/or a luminaire socket.

The invention also relates to a luminaire or a lamp comprising a light emitting device according to the invention. Such a luminaire or such a lamp may for instance be a light bulb, an incandescent lamp or a filament lamp.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
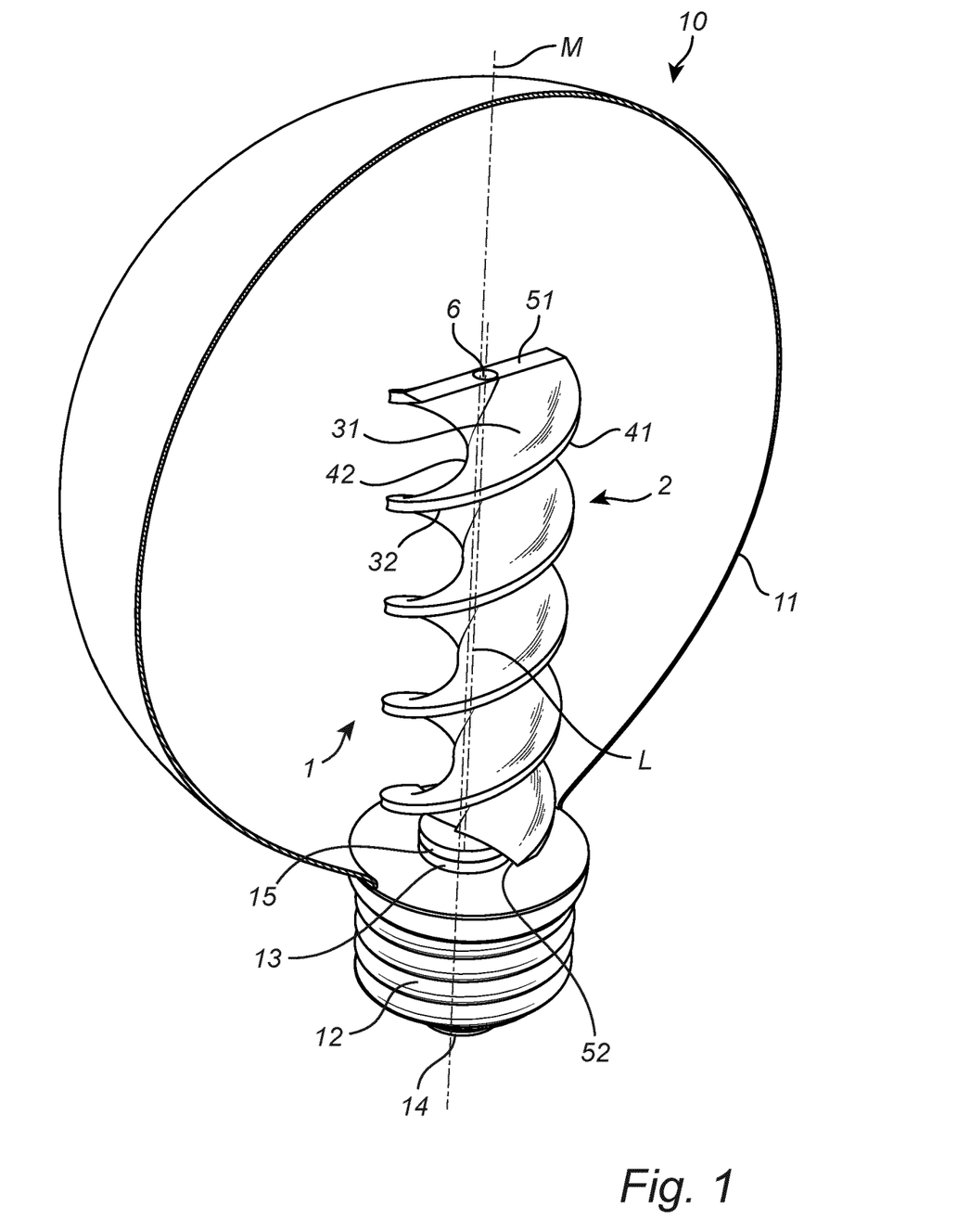
FIG. 1 shows a perspective view of a luminaire comprising a first embodiment of a light emitting device according to the invention.
Figure 2:
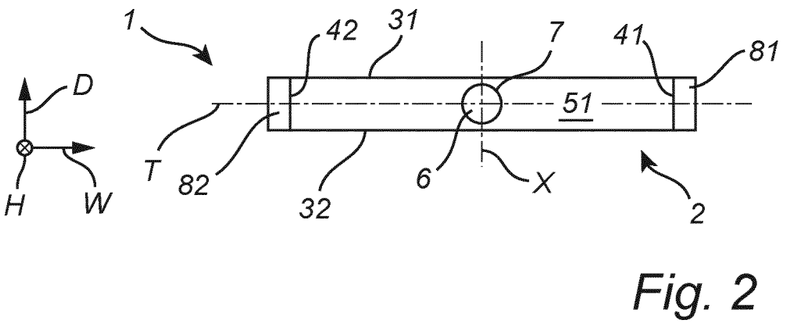
FIG. 2 shows a cross-sectional top view of the light emitting device shown in FIG. 1.
Figure 3:
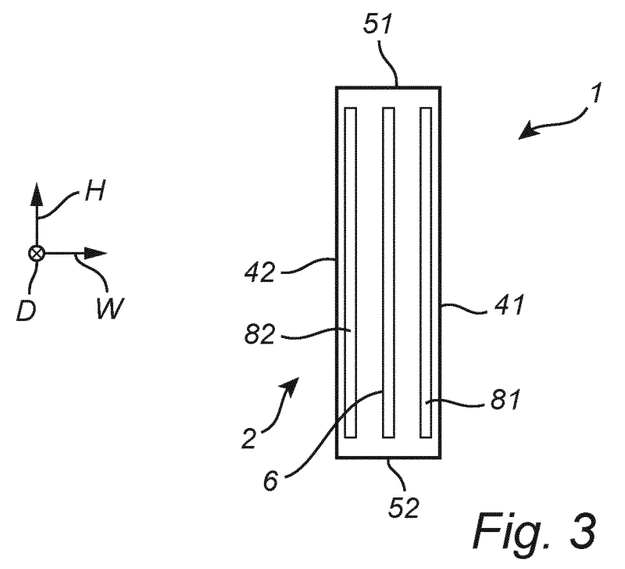
FIG. 3 shows a cross-sectional side view of the light emitting device shown in FIG. 1.
Figure 4:
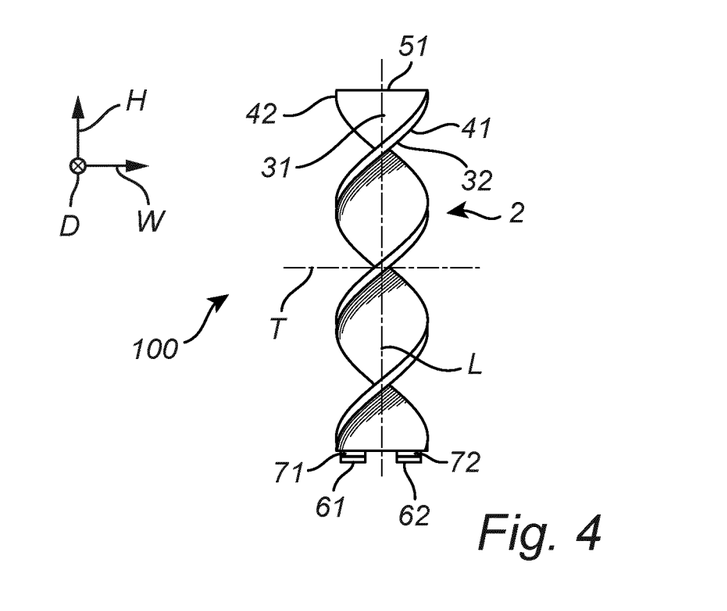
FIG. 4 shows a perspective side view of the light emitting device shown in FIG. 1.

Reference is first made to FIGS. 1-4. FIGS. 1 and 4 show perspective views of a light emitting device 1 according to a first embodiment of the invention. FIG. 2 shows the light emitting device 1 in a cross-sectional top view and FIG. 3 shows the light emitting device 1 in a cross-sectional side view.

Generally, and irrespective of the embodiment, the light emitting device 1 comprises at least one LED light source 6, 61, 62 adapted for, in operation, emitting light source light, an elongated light guide 2, at least one light in-coupling element 7, 71, 72 and at least one light out-coupling element 81, 82.

The elongated light guide 2 generally comprises a height direction, H, a width direction, W, a depth direction, D, a central longitudinal axis, L, extending in the height direction, H, a transversal axis, T, extending in the width direction, W, and a depth axis, X, extending in the depth direction, D. Generally, the relative dimensions of the elongated light guide 2 are chosen such that it is larger in the height direction, H, than in the width direction, W, and in the depth direction, D, and furthermore such that it is larger in the width direction, W, than in the depth direction, D.

The elongated light guide 2 is generally twisted around its central longitudinal axis, L. Thereby the elongated light guide 2 is provided with a twisted shape, particularly twisted in a manner like a screw. The light guide 2 shown in FIG. 1 is shaped as an Archimedes screw. In principle, the light guide 2 may be twisted such as to have any suitable number of twists, loops or windings. To obtain a suitable spiral light effect, it is desired to twist the light guide 2 such that it shows at least 3 twists, loops or windings.

The elongated light guide 2 further generally comprises a first major surface 31 and a second major surface 32. The second major surface 32 is arranged extending in parallel with and opposite to the first major surface 31 seen in the depth direction, D, of the elongated light guide 2. The elongated light guide 2 further generally comprises a first minor surface 41 and a second minor surface 42. The second minor surface 42 is arranged extending parallel with and opposite to the first minor surface 41 seen in the width direction, W, of the elongated light guide 2. The elongated light guide 2 further generally comprises a first end 51 and a second end 52. The second end 52 is arranged extending parallel with and opposite to the first end 51 in the height direction, H, of the elongated light guide 2. The elongated light guide 2 is thus generally plate-shaped. The elongated light guide 2 may be made of a polymer such as PMMA, PC, PET, silicone, or the like. Generally, the relative dimensions of the elongated light guide 2 are chosen such that the area of the major surfaces 31, 32 is larger than the area of the minor surfaces 41, 42 and the area of the ends 51, 52, respectively, and furthermore such that the area of the minor surfaces 41, 42 is larger than the area of the ends 51, 52.

The first major surface 31 has a first major surface area MA1 and the second major surface 32 has a second major surface area MA2. The first minor surface 41 has a first minor surface area mA1 and the second minor surface 42 has a second minor surface area mA2. The said surface areas may fulfill one or more of the following relations: MA1>5*mA1, MA2>5*mA2, MA1=MA2 and mA1=mA2.

In other embodiments not all mutually opposite pairs of surfaces 31, 32; 41, 42; 51, 52 need be parallel. Rather, in some embodiments, one or more of the first major surface 31 and the second major surface 32, the first minor surface 41 and the second minor surface 42, and the first end 51 and the second end 52, respectively, may be mutually non-parallel.

The at least one LED light source 6, 61, 62 may be an LED filament 6 (cf. FIGS. 2 and 3) or one or more LEDs 61, 62 (cf. FIG. 4). The at least one LED light source 6, 61, 62 may be or comprise any one or more of warm white LEDs, cool white LEDs and red, green and blue (RGB) LED(s). As shown in FIG. 4, the two LEDs 61, 62 are arranged at the second end 52 of the light guide 2. Alternatively, or additionally, LEDs may be provided at the first end 51 of the light guide 2. Still alternatively, or additionally, LEDs may be provided at one of the first minor surface 41 and the second minor surface 42 of the light guide 2. Combinations of LED light sources in the form of LED filament(s) 6 and LED(s) 61, 62 are also feasible.

As shown in FIGS. 1-3, when the LED light sources are provided in the form of LED filament(s) 6, the LED filament 6 is arranged centrally in the light guide 2. More generally, the LED filament 6 extends in the height direction H of the light guide 2 throughout a part or all of the light guide 2. A LED filament 6 generally comprises a plurality of LEDs arranged on an elongated carrier. Typically, LED filaments comprise more than 10 LEDs, more than 15 LEDs, or more than 20 LEDs. An encapsulant may encapsulate at least part of the plurality of LEDs. The encapsulant may comprise a phosphor and/or a luminescent material. In embodiments where a luminescent material is present in the encapsulant, the LEDs may emit UV and or blue light. In case of no luminescent material being present in the encapsulant, RGB LEDs may be used. The LED filament 6 has a width WF, a height HF and length LF. In an embodiment LF>10*WF and LF>10*HF. The LED filament 6 may be inserted in a hole in the light guide 2, where the hole is provided at the central longitudinal axis L of the light guide 2.

Also, more than one LED light source 6, 61, 62 may be provided. In such an embodiment, the LED light sources may comprise a first light source emitting first light source light and a second light source emitting second light source light being different from the first light source light. Furthermore, the light emitting device 1 may comprise a controller for individually controlling the first light source and the second light source to tune the color and/or color temperature. Examples of LED light sources for embodiments with more than one light source include RGB LEDs, CW and WW LEDs, and RGBW LEDs.

The one or more light in-coupling elements 7, 71, 72 are configured to couple the light source light into the elongated light guide 2. Generally, the one or more light in-coupling elements 7, 71, 72 are arranged adjacent to the LED light source(s) 6, 61, 62. the one or more light in-coupling elements 7, 71, 72 may thus be arranged at one or more of the first end 51, at the second end 52, at the first minor surface 41, at the second minor surface 42 or in the elongated light guide 2.

In the embodiment shown in FIGS. 1-3, one light in-coupling element 7 is provided. The light in-coupling element 7 is arranged centrally in the light guide 2. The light in-coupling element 7 extends in the height direction H of the light guide 2 throughout a part or all of the light guide 2. The light in-coupling element 7 forms part of or is provided as a structure arranged adjacent to the LED light source 6 which is provided in the shape of a LED filament.

FIG. 4 shows an alternative embodiment of a light emitting device 100 according to the invention, differing only from the light emitting device 1 of FIGS. 1-3 in that two LED light sources 61 and 62 and two light in-coupling elements 71 and 72 are provided. The light in-coupling elements 71, 72 are arranged at the second end 52 of the light guide 2 between the two LED light sources 61 and 62 and the second end 52.

The one or more light out-coupling elements 81, 82 are configured to couple the light source light out of the elongated light guide. The one or more light out-coupling elements 81, 82 are furthermore elongated. The one or more light out-coupling elements 81, 82 may further in some embodiments comprise additional features, such as but not limited to light scattering features, light refracting features, light diffracting features and light converting features. The light out-coupling elements 81, 82 may be scattering particles, such as $BaSO_4$, $TiO_2$, $Al_2O_3$, or the like.

In the embodiment shown—cf. FIGS. 2 and 3—two light out-coupling elements are provided. The two light out-coupling elements 81, 82 are arranged on or adjacent to at least a part of both the first minor surface 41 and the second minor surface 42. The two light out-coupling elements 81, 82 may also be arranged on or adjacent to all of both of the first minor surface 41 and the second minor surface 42. Alternatively, one of the light out-coupling elements 81, 82 may be omitted.

Figure 5:
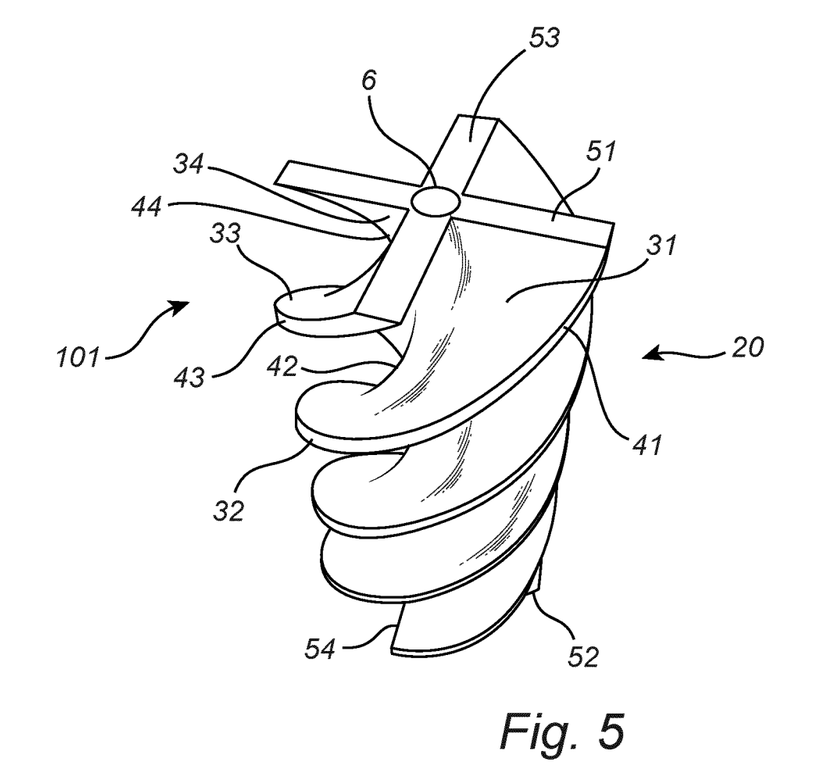
FIG. 5 shows a perspective view of a light emitting device according to a second embodiment of the invention.
Figure 6:
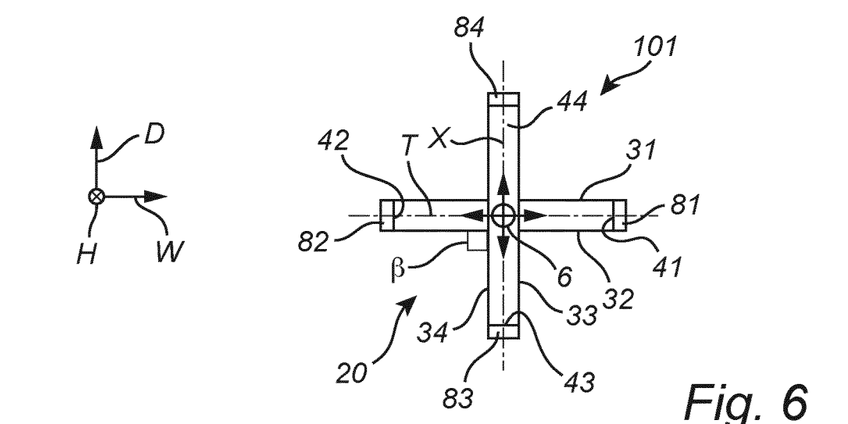
FIG. 6 shows a perspective top view of the light emitting device according to FIG. 5.

Turning now to FIGS. 5 and 6 a perspective view and a cross-sectional top view, respectively, of a light emitting device 101 according to a second embodiment of the invention is shown. The light emitting device 101 differs from those described above in relation to FIGS. 1-4 in virtue of the following features.

The light emitting device 101 comprises an elongated light guide 20, which comprises the same general features as the light guide 2 shown in FIGS. 1-4. Additionally, the elongated light guide 20 comprises a third major surface 33 and a fourth major surface 34. The fourth major surface 34 arranged extending parallel with and opposite to the third major surface 33. The third major surface 33 and the fourth major surface 34 further extend in an angle, β, with respect to the first major surface 31 and the second major surface 32. The angle, β, is shown in FIG. 6. The elongated light guide 20 also comprises a third minor surface 43 and a fourth minor surface 44. The fourth minor surface 44 is arranged extending parallel with and opposite to the third minor surface 43. The third minor surface 43 and the fourth minor surface 44 further extend in an angle, β, with respect to the first minor surface 41 and the second minor surface 42. The elongated light guide 20 also comprises a third end 53 and a fourth end 54. The fourth end 54 is arranged extending parallel with and opposite to the third end 53. The third end 53 and the fourth end 54 extend in an angle, β, with respect to the first end 51 and the second end 52. In the embodiment shown in FIGS. 5 and 6, the angle, β, is approximately 90 degrees. In other embodiments, the angle, β, may be different from 90 degrees, such as for instance between 45 degrees and 90 degrees, or even below 45 degrees. Generally, the angle, β, is different from 0 degrees.

The third major surface 33 has a third major surface area MA3 and the fourth major surface 34 has a fourth major surface area MA4. The third minor surface 43 has a third minor surface area mA3 and the fourth minor surface 44 has a fourth minor surface area mA4. The said surface areas may fulfill one or more of the following relations: MA3>5*mA3, MA4>5*mA4, MA3=MA4 and mA3=mA3.

In other embodiments not all mutually opposite pairs of surfaces 31, 32; 41, 42; 51, 52; 33, 34; 43, 44; 53, 54 need be parallel. Rather, one or more of the first major surface 31 and the second major surface 32, the first minor surface 41 and the second minor surface 42, the first end 51 and the second end 52, the third major surface 33 and the fourth major surface 34, the third minor surface 43 and the fourth minor surface 44, and the third end 53 and the fourth end 54 may be mutually non-parallel.

The light emitting device 101 further comprises four light out-coupling elements 81, 82, 83, 84. In the embodiment shown—cf. FIG. 6 the four light out-coupling elements 81, 82, 83, 84 are arranged on or adjacent to at least a part of each of the first minor surface 41, the second minor surface 42, the third minor surface 43 and the fourth minor surface 44. In other embodiments one, two or three of the light out-coupling elements may be omitted.

The elongated light guide 20 is also generally twisted around its central longitudinal axis, L. Thereby the elongated light guide 20 is provided with a double twisted shape, particularly twisted in a manner like a double screw. The light guide 20 shown in FIG. is shaped as a double Archimedes screw.

In the embodiment shown in FIGS. 5 and 6, the LED light source is a LED filament 6. Alternatively, or additionally, LEDs may be provided at one or more of the first end 51, the second end 52, the third end 53 and the fourth end 54.

Figure 7:
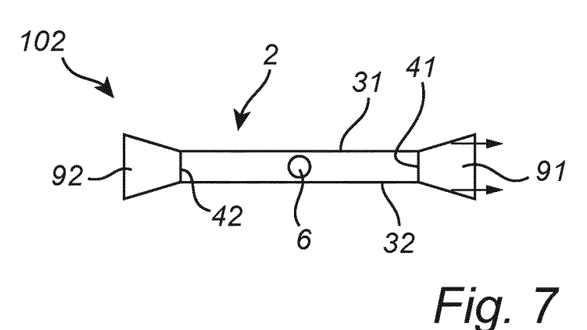
FIG. 7 shows a perspective top view of a light emitting device according to a third embodiment of the invention.

FIG. 7 shows a cross-sectional top view of a light emitting device 102 according to a third embodiment of the invention is shown. The light emitting device 102 differs from those described above in relation to FIGS. 1-6 in virtue of that the first minor surface 41 and the second minor surface 42 comprises a collimator 91 and 92, respectively. Thus, put in more general terms, one or more of the first minor surface 41, the second minor surface 42, the third minor surface 43 and the fourth minor surface 44 may be adapted for collimating incident light such that the light emitting device 102 emits collimated light.

Figure 8:
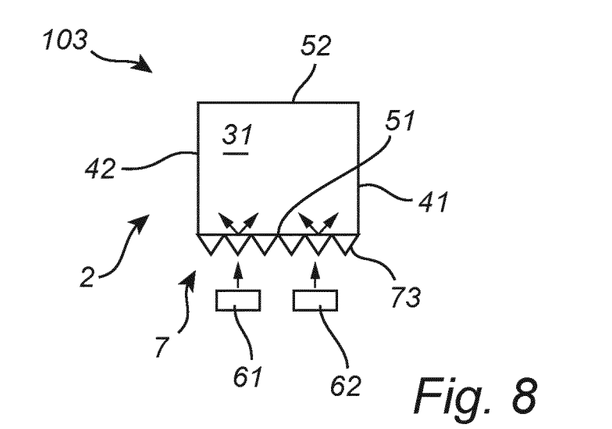
FIG. 8 shows a perspective side view of a light emitting device according to a fourth embodiment of the invention.

FIG. 8 shows a cross-sectional side view of a light emitting device 103 according to a fourth embodiment of the invention is shown. The light emitting device 103 differs from those described above in relation to FIGS. 1-7 in virtue of that the at least one light incoupling means 7 is arranged at the first end 51 of the light guide 2. Furthermore, the light incoupling means 7 comprises anisotropic light distributing features 73.

Figure 9:
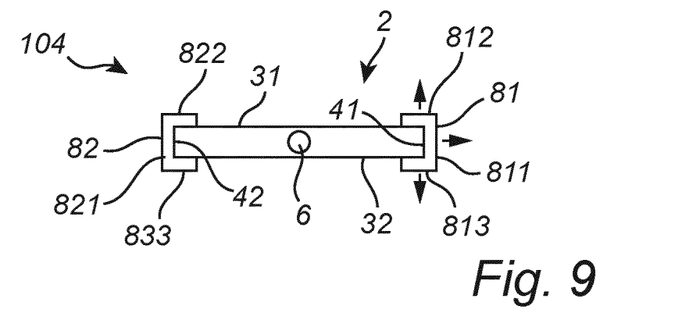
FIG. 9 shows a perspective top view of a light emitting device according to a fifth embodiment of the invention.

FIG. 9 shows a cross-sectional top view of a light emitting device 104 according to a fifth embodiment of the invention is shown. The light emitting device 104 differs from those described above in relation to FIGS. 1-8 in virtue of that the two light out-coupling element 81 and 82 each comprises multiple surfaces. In the embodiment shown, the two light out-coupling element 81 and 82 each comprise three surfaces 811, 812, 813; 821, 822, 823. Thus, in this embodiment the light out-coupling element 81 as arranged such that a first surface 811 abuts the first minor surface 41, a second surface 812 abuts the first major surface 31 and a third surface 813 abuts the second major surface 32. Similarly, the light out-coupling element 82 as arranged such that a first surface 821 abuts the second minor surface 42, a second surface 822 abuts the first major surface 31 and a third surface 823 abuts the second major surface 32. Alternatively, the light out-coupling elements 81, 82 may also comprise two, four or five surfaces. In another alternative, the light out-coupling elements 81, 82 may also comprise a mutually different number of surfaces.

Figure 10:
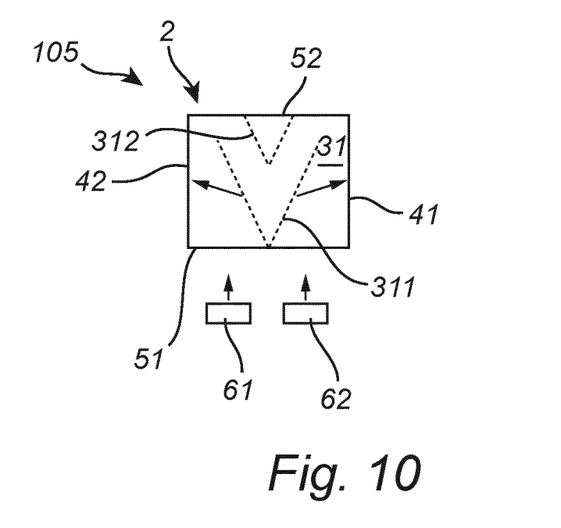
FIG. 10 shows a perspective side view of a light emitting device according to a sixth embodiment of the invention.

FIG. 10 shows a cross-sectional side view of a light emitting device 105 according to a sixth embodiment of the invention is shown. The light emitting device 105 differs from those described above in relation to FIGS. 1-9 in virtue of that the first major surface 31 comprises at least one, and in the embodiment shown two, light shaping features 311 and 312. Other numbers of light shaping features may also be feasible. Put in more general terms, at least one of the first major surface 31, the second major surface 32, the third major surface 33 and the fourth major surface 34 may thus comprise at least one light shaping feature 311, 312.

Referring now again to FIG. 1, a light emitting device according to any of the embodiments described herein—or indeed a combination of such embodiments—may be used in a luminaire 10 such as a light bulb. The luminaire 10 shown in FIG. 1 comprises by way of a non-limiting example one light emitting device 1 according to the invention. A luminaire may in principle also comprise more than one, such as two, three or more light emitting devices according to the invention. The light emitting device according to the invention may in thus connection be arranged in the luminaire 10 such that the central longitudinal axis, L, of the elongated light guide 2 extends in parallel with a longitudinal axis M of the luminaire 10 as is shown in FIG. 1. Alternatively, the light emitting device according to the invention may be arranged in the luminaire 10 such that the central longitudinal axis, L, of the elongated light guide 2 extends perpendicular to the longitudinal axis M of the light emitting device 1.

The luminaire 10 comprises a luminaire socket 12 and a luminaire base 13 for mechanically and/or electrically connecting the light emitting device 1 to the luminaire socket 12. The luminaire socket 12 may furthermore comprise a terminal 14 for electric connection to a terminal of an external power source.

Therefore, the light emitting device may further comprise a base 15 for connecting the light emitting device to the luminaire base 13 and thereby the luminaire socket 12. The luminaire socket 12 provides electrical power to the light source 6, 61, 62 of the light emitting device 1, respectively, through the luminaire base 13.

The luminaire base 13, may, as shown on FIG. 1, also act as a holder or support for supporting the light emitting device 1.

In another embodiment it may also be feasible to omit the luminaire base 13, in which case the base 15 of the light emitting device 1 is adapted for connection directly to the luminaire socket 12. In yet another embodiment it may also be feasible to omit the base of the light emitting device 1, in which case the luminaire base 13 is adapted for connection directly to the light emitting device 1.

The luminaire 10 may further comprise an enveloping structure or bulb 11 partly or fully enveloping the light emitting device 1. In the embodiment shown, the envelope or bulb 11 is arranged in a distance from light emitting device 1.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:
1. A light emitting device comprising:
at least one LED light source adapted for, in operation, emitting light source light, and
an elongated light guide comprising a height direction a width direction, a depth direction and a central longitudinal axis extending in the height direction, wherein the elongated light guide further comprises:
a first major surface and a second major surface arranged extending opposite to the first major surface in the depth direction of the elongated light guide,
a first minor surface and a second minor surface arranged extending opposite to the first minor surface in the width direction of the elongated light guide, and
a first end and a second end arranged extending opposite to the first end in the height direction of the elongated light guide,
wherein the elongated light guide further comprises at least one light in-coupling element configured to couple the light source light into the elongated light guide and at least one light out-coupling element configured to couple the light source light out of the elongated light guide, the elongated light guide being configured to guide at least a portion of the light source light which is coupled into the light guide at the light in-coupling element via total internal reflection to the light out-coupling element,
wherein the elongated light guide is twisted around the central longitudinal axis of the light guide,
wherein the at least one light out-coupling is elongated, and
wherein the at least one light in-coupling element comprises a LED filament extending in the height direction of the light guide throughout a part or all of the light guide.

2. A light emitting device according to claim 1, wherein the elongated light guide further comprises:
   a third major surface and a fourth major surface arranged extending opposite to the third major surface, the third major surface and the fourth major surface extending in an angle, β, with respect to the first major surface and the second major surface,
   a third minor surface and a fourth minor surface arranged extending opposite to the third minor surface, the third minor surface and the fourth minor surface extending in an angle, β, with respect to the first minor surface and the second minor surface, and
   a third end and a fourth end arranged extending opposite to the third end, the third end and the fourth end extending in an angle, β, with respect to the first end and the second end.

3. A light emitting device according to claim 2, wherein the angle, β, is 90 degrees.

4. A light emitting device according to claim 1, wherein the elongated light guide is twisted around the central longitudinal axis of the light guide such as to have the shape of a screw, an Archimedes screw, a double screw or a double Archimedes screw.

5. A light emitting device according to claim 1, wherein the at least one light out-coupling element is arranged on or adjacent to at least a part of any one or more of the first minor surface, the second minor surface, the third minor surface and the fourth minor surface.

6. A light emitting device according to claim 1, wherein the at least one light out-coupling element comprises any one or more of light scattering features, light refracting features, light diffracting features and light converting features.

7. A light emitting device according to claim 1, wherein the at least one light in-coupling element is arranged any one or more of at the first end, at the second end, at the third end, at the fourth end, at the first minor surface, at the second minor surface, at the third minor surface, at the fourth minor surface or in the elongated light guide.

8. A light emitting device according to claim 1, wherein one or more of the first minor surface, the second minor surface, the third minor surface- and the fourth minor surface is adapted for collimating incident light.

9. A light emitting device according to claim 1, the at least one light incoupling means comprises anisotropic light distributing features.

10. A light emitting device according to claim 1, wherein the at least one light out-coupling element comprises multiple surfaces.

11. A light emitting device according to claim 1, wherein at least one of the first major surface, second major surface, third major surface and fourth major surface comprises at least one light shaping feature.

12. A light emitting device according to claim 1, wherein the average intensity at the minor surfaces is I1, wherein the average intensity at the major surfaces is I2, and wherein I1>2*I2.

13. A light emitting device according to claim 1, wherein at least one of:
   the first major surface and the second major surface,
   the first minor surface and the second minor surface,
   the first end and the second end,
   the third major surface and the fourth major surface,
   the third minor surface and the fourth minor surface, and
   the third end and the fourth end,
   are mutually parallel.

14. A luminaire or a lamp comprising a light emitting device according to claim 1.

* * * * *